United States Patent Office 3,458,304
Patented July 29, 1969

3,458,304
N-[DISUBSTITUTED-AMINO] FUMARAMIC ACIDS AND DERIVATIVES THEREOF AS PLANT GROWTH REGULATING AGENTS
Howard A. Hageman, Southbury, and Winchester L. Hubbard, Woodbridge, Conn., assignors to Uniroyal, Inc., New York, N.Y., a corporation of New Jersey
No Drawing. Filed Jan. 28, 1966, Ser. No. 535,270
Int. Cl. A01m 9/22; C07d 87/38; C07c 103/58
U.S. Cl. 71—76           22 Claims

ABSTRACT OF THE DISCLOSURE

N-[disubstituted-amino] fumaramic acids and derivatives thereof as plant growth regulants.

---

The instant invention relates to a plant growth regulant. More specifically, this invention teaches the use of N-[disubstituted-amino] fumaramic acids and derivatives thereof for retarding the growth of plants.

A variety of N-[disubstituted-amino] maleamic acids have been shown to be of great interest as growth regulating agents. Of prime importance in this group of chemicals are N-[dimethylamino] maleamic acid and its esters. While these compounds exhibit high activity as dwarfing agents, two deficiencies have hindered their development as a commercial material. When applied to plants at high levels for the purpose of obtaining a dwarfing effect, there is frequently observed a phytotoxic effect which is undesirable. Secondly, the susceptibility to hydrolysis of N-[dimethylamino] maleamic acid results in poor storage stability and prohibits the use of formulations in aqueous solutions which possess sufficient stability on storage. The fumaric acid derivatives of this invention overcome these deficiencies.

The N-[disubstituted-amino] radicals may be dialkylamino, 1-pyrrolidyl, 1-piperidyl, or 4-morpholinyl; and one of the carbons of the intermediate double-bonded carbons of the fumaramic acid may contain a lower alkyl group. Additionally, salts and esters of the N-[disubstituted-amino] fumaramic acids as well as salts of these esters with strong mineral acids are within the scope of the invention.

The N-[disubstituted-amino] fumaramic acids are prepared by the isomerization of a strong acid salt of the corresponding N-[disubstituted-amino] maleamic acid as described in copending application Ser. No. 523,545 filed simultaneously with this application.

The acids may be used as plant growth regulants in the form of the free acids or their equivalent salts, such as the alkali salts, i.e., alkali metal, alkaline earth metal, ammonium or amine (substituted ammonium) salts, e.g., sodium, potassium, ammonium, methyl ammonium, dimethyl ammonium, trimethyl ammonium, ethyl ammonium, ethanol ammonium, diethanol ammonium, or triethanol ammonium salts, since the salts give equivalent results. The salts may readily be formed directly from the acid and a selected base such as an alkali-metal hydroxide or carbonate, or ammonia, or an amine.

Additionally, by protonation of the disubstituted amino groups, salts of strong mineral acids may be formed. Such salts include, for example, the hydrohalide, (e.g., hydrochloride), phosphate and sulfate.

The esters of the N-[disubstituted-amino] fumaramic acids, such as the alkyl esters having 1 to 12 carbon atoms in the esterifying radical and the alkenyl esters having 3 to 4 carbon atoms in the esterifying radical may be used as plant growth regulants, e.g., the methyl, ethyl, propyl, butyl, octyl, dodecyl, allyl and methallyl esters. The esters may be formed by esterifying the selected N-[disubstituted-amino] fumaramic acid with the selected alcohol. Also the salts of these esters with strong mineral acids may be used.

The N-[disubstituted-amino] fumaramic acids of the present invention are represented by the general formula:

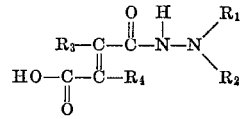

wherein $R_1$ and $R_2$ each stand for an alkyl group having 1 to 12 carbon atoms or $R_1$ and $R_2$ compositely stand for a $-(CH_2)_4-$, $-(CH_2)_5-$ or $(-CH_2CH_2)_2O$ group; and $R_3$ and $R_4$ each stand for hydrogen, or one of $R_3$ and $R_4$ stands for hydrogen and the other stands for a lower alkyl group having 1 to 8 carbon atoms, e.g. methyl, butyl, octyl.

Examples of chemicals which may be used in the present invention are:

N-[dimethylamino] fumaramic acid
N-[dimethylamino] fumaramic acid hydrochloride
N-[dimethylamino] fumaramic phosphate
N-[dioctylamino] fumaramic acid
N-[didodecylamino] fumaramic acid
N-(4-morpholinyl) fumaramic acid
N-(1-piperidyl) fumaramic acid
N-(1-pyrrolidyl) fumaramic acid
Sodium N-[dimethylamino] fumaramate
Calcium N-[dimethylamino] fumaramate
Isopropyl N-[dimethylamino] fumaramate
Ethyl N-[dimethylamino] fumaramate hydrochloride
N-[dimethylamino] mesaconamic acid
Ethyl N-[dimethylamino] fumaramate
Diethanolammonium salt of N-[dimethylamino] fumaramic acid
Allyl N-[dimethylamino] fumaramate
Methallyl-N-(dimethylamino) fumaramate hydrochloride The effectiveness of the chemicals of the present invention as plant growth regulants, and particularly as dwarfing agents, is illustrated in the following examples.

EXAMPLE I

This example illustrates the treatment of growing plants with the chemicals of the present invention.

Water solutions or dispersions of the chemicals were prepared containing 5000, 2000 and 500 parts per million (p.p.m.) of various chemicals of the invention and a small amount of a surface-active wetting agent (isooctyl phenyl polyethoxy ethanol) which is known to be inactive in the tests run.

Peanut plants in the 2 to 3 leaf stage were sprayed to run off with aqueous compositions prepared as above.

The treated plants were placed in a chamber where the temperature was held at 75° F. (24° C.) and the relative humidity above 98% for 20 hours before they were returned to the greenhouse. Height measurements were made and the average height of the plant is shown in the table below. The increase in growth was used to calculate the percent retardation of new growth of treated plants as compared to that of untreated controls.

EXPERIMENT 1

| Chemicals | Rate p.p.m. | Average initial height, mm. | Average height after 40 days, mm. | Growth increase | Percent retardation |
|---|---|---|---|---|---|
| Controls | | 71.2 | 120 | 48.8 | |
| N-[dimethylamino] fumaramic acid hydrochloride. | 5,000 | 68.7 | 73.7 | 5.0 | 90 |
| | 2,000 | 61.2 | 68.7 | 7.5 | 85 |
| | 500 | 57.5 | 66.2 | 8.7 | 82 |
| N-[dimethylamino] fumaramic acid.[1] | 5,000 | 58.7 | 65.0 | 6.3 | 87 |
| | 2,000 | 62.5 | 68.7 | 6.2 | 87 |
| | 500 | 75.0 | 77.5 | 2.5 | 95 |

[1] A small amount of sodium carbonate was added to the aqueous preparation forming the sodium salt in solution.

EXPERIMENT 2

| Chemicals | Rate p.p.m. | Average initial height, mm. | Average height after 29 days, mm. | Growth increase | Percent retardation |
|---|---|---|---|---|---|
| Controls | | 48.3 | 78.3 | 30.0 | |
| Ethyl-N-[dimethylamino]-fumaramate hydrochloride. | 5,000 | 48.7 | 53.7 | 5.0 | 83 |
| | 2,000 | 47.5 | 65.0 | 17.5 | 42 |
| | 500 | 51.2 | 68.7 | 17.5 | 42 |
| Ethyl-[N-dimethyl amino] fumaramate. | 5,000 | 47.5 | 60 | 12.5 | 58 |
| | 2,000 | 47.5 | 60 | 12.5 | 58 |
| | 500 | 50.0 | 67.5 | 17.5 | 42 |
| N-(1-piperidyl) fumaramic acid hydrochloride. | 5,000 | 45 | 66.2 | 21.2 | 20 |
| | 2,000 | 45 | 65 | 20 | 33 |
| | 500 | 47.5 | 70 | 22.5 | 25 |
| N-(1-piperidyl) fumaramic acid. | 5,000 | 45 | 67.5 | 22.5 | 25 |
| | 2,000 | 46.7 | 67.5 | 20.8 | 31 |
| | 500 | 47.5 | 70.0 | 22.5 | 25 |
| N-[dimethylamino] mesaconamic acid hydrochloride. | 5,000 | 48.2 | 72.5 | 24.3 | 19 |
| | 2,000 | 42.5 | 67.5 | 25.0 | 17 |
| | 500 | 46.2 | 65.0 | 18.8 | 37 |

EXPERIMENT 3

| Chemicals | Rate p.p.m. | Average initial height, mm. | Average height after 24 days, mm. | Growth increase | Percent retardation |
|---|---|---|---|---|---|
| Controls | | 30.5 | 61.6 | 31.4 | |
| Methyl-N-[dimethylamino-fumaramate hydrochloride. | 5,000 | 26.2 | [1] 36.2 | 10.0 | 68 |
| | 2,000 | 25.0 | 41.2 | 16.2 | 48 |
| | 500 | 25.0 | 50.0 | 25.0 | 20 |
| Methyl-N-[dimethylamino]-fumaramate. | 5,000 | 27.5 | 37.5 | 10 | 68 |
| | 2,000 | 28.7 | 43.7 | 15 | 52 |
| | 500 | 23.7 | 45.0 | 21.3 | 32 |

[1] Slight phytotoxicity.

EXPERIMENT 4

| Chemicals | Rate p.p.m. | Average initial height, mm. | Average height after 40 days, mm. | Growth increase | Percent retardation |
|---|---|---|---|---|---|
| Controls | | 47.5 | 115.0 | 67.5 | |
| N-(4-morpholinyl) fumaramic acid. | 5,000 | 47.5 | 67.5 | 20.0 | 70.4 |
| | 2,000 | 53.7 | 77.5 | 23.8 | 64.8 |
| | 500 | 52.5 | 90.0 | 37.5 | 44.5 |

EXAMPLE II

Peanut plants were treated with comparable sprays of N-[dimethylamino] fumaramic acid and N-[dimethylamino] maleamic acid. The test chemicals were prepared as aqueous solutions containing 20,000 p.p.m. by adding three grams of the test chemical to 150 ml. of water containing one drop of Triton X-100, a surface active agent. Because N-[dimethylamino] fumaramic acid is only sparingly soluble in water, a small amount of sodium carbonate was added to the suspension which would react to form the soluble sodium salt of N-[dimethylamino] fumaramic acid in solution in water. These 20,000 p.p.m. solutions were then diluted with water to form 15,000 p.p.m., 10,000 p.p.m. and 5,000 p.p.m. spray dilution as well as the 20,000 p.p.m. preparation.

Young peanut plants 6 to 7.5 cm. in height were treated with these solutions by spraying with a spray atomizer until the plants were wet. Six plants were treated at each rate.

Three plants of each treatment were returned directly to the greenhouse, 75°–85° F. (24–29° C.) temperature and 30–50% relative humidity, and the other three plants of each treatment were placed in a high humidity chamber at 75° F. (24° C.) temperature and 98–100% relative humidity.

At the end of a 24 hour period the plants were examined and the following visual estimates of injury were made:

| Chemicals | Rate, p.p.m. | Percent injury | |
|---|---|---|---|
| | | Greenhouse | Humidity chamber |
| N-dimethylamino fumaramic acid | 20,000 | 5 | 10 |
| | 15,000 | 0 | 5 |
| | 10,000 | 0 | 0 |
| | 5,000 | 0 | 0 |
| N-dimethylaminomaleamic acid | 20,000 | 10 | 1 30 |
| | 15,000 | 5 | 10 |
| | 10,000 | 0 | 5 |
| | 5,000 | 0 | 0 |
| Controls | | 0 | 0 |
| | | 0 | 0 |

[1] Plus twisting of foliage.

From the table it will be noted that a rate 50% higher in concentration can be tolerated by the plants treated with N-[dimethylamino] fumaramic acid of the invention than with N-[dimethylamino] maleamic acid.

Having thus described our invention, what we claim and desire to protect by Letters Patent is:

1. A plant growth regulant composition which comprises: (1) a plant growth regulating, but non-injurious, amount of a disubstitutedamino fumaramic compound having the formula:

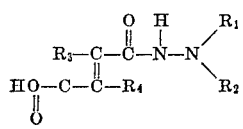

wherein $R_1$ and $R_2$ are alkyl groups having 1 to 12 carbon atoms or compositely are a $-(CH_2)_4-$, $-(CH_2)_5-$, or $-(CH_2CH_2)_2O$ group, $R_3$ and $R_4$ are both hydrogen or one is hydrogen and the other is an alkyl group having 1 to 8 carbon atoms; or the alkyl ester of said compound in which the alkyl group has 1 to 12 carbon atoms; the alkenyl ester of said compound in which the alkenyl group has 3 or 4 carbon atoms; or the alkali metal, alkaline earth metal, ammonium, or amine salt of the carboxyl group of said compound; or the strong mineral acid salt of the disubstitutedamino group of said compound; and (2) a surface active agent.

2. The composition of claim 1 wherein said $R_3$ and $R_4$ are hydrogen.

3. The composition of claim 1 wherein $R_1$ and $R_2$ are methyl or ethyl and $R_3$ and $R_4$ are hydrogen.

4. The composition of claim 1 wherein a plant growth regulating amount of the alkyl ester is present in which the alkyl group is methyl or ethyl.

5. The composition of claim 1 wherein a plant growth regulating amount of the strong mineral acid salt of the disubstituted amino group is present.

6. The composition of claim 1 wherein a plant growth regulating amount of N-[dimethylamino] fumaramic acid is present.

7. The composition of claim 1 wherein a plant growth regulating amount of N-[dimethylamino] fumaramic acid hydrochloride is present.

8. The composition of claim 1 wherein a plant growth regulating amount of sodium N-[dimethylamino] fumaramate is present.

9. The composition of claim 1 wherein a plant growth regulating amount of methyl or ethyl-N-[dimethylamino] fumaramate hydrochloride is present.

10. The composition of claim 1 wherein methyl or ethyl-N-[dimethylamino] fumaramate is present.

11. The composition of claim 1 wherein a plant growth regulating amount of N-(4-morpholinyl) fumaramic acid is present.

12. A method of regulating plant growth which comprises treating a plant with a plant growth retarding, but non-injurious, amount of a disubstitutedamino fumaramic compound having the formula:

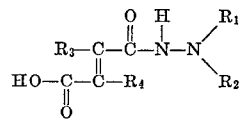

wherein $R_1$ and $R_2$ are alkyl groups having 1 to 12 carbon atoms or compositely are a $-(CH_2)_4-$, $-(CH_2)_5-$, or $-(CH_2CH_2)_2O$ group, $R_3$ and $R_4$ are both hydrogen or one is hydrogen and the other is an alkyl group having 1 to 8 carbon atoms; or the alkyl ester of said compound in which the alkyl group has 1 to 12 carbon atoms; the alkenyl ester of said compound in which the alkenyl group has 3 or 4 carbon atoms; or the alkali metal, alkaline earth metal, ammonium, or amine salt of the carboxyl group of said compound; or the strong mineral acid salt of the disubstitutedamino group of said compound.

13. The method of claim 12 wherein said $R_3$ and $R_4$ are hydrogen.

14. The method of claim 12 wherein $R_1$ and $R_2$ are methyl or ethyl and $R_3$ and $R_4$ are hydrogen.

15. The method of claim 12 wherein the plant is treated with an alkyl ester in which the alkyl group is methyl or ethyl.

16. The method of claim 12 wherein the plant is treated with a strong mineral acid salt of the disubstituted amino group.

17. The method of claim 12 wherein the plant is treated with N-[dimethylamino] fumaramic acid.

18. The method of claim 12 wherein the plant is treated with N-[dimethylamino] fumaramic acid hydrochloride.

19. The method of claim 12 wherein the plant is treated with sodium N-[dimethylamino] fumaramate.

20. The method of claim 12 wherein the plant is treated with methyl or ethyl-N-[dimethylamino] fumaramate hydrochloride.

21. The method of claim 12 wherein the plant is treated with methyl or ethyl-N-[dimethylamino] fumaramate.

22. The method of claim 12 wherein the plant is treated with N-(4-morpholinyl) fumaramic acid.

References Cited

UNITED STATES PATENTS

| | | | |
|---|---|---|---|
| 2,835,703 | 5/1958 | Caldwell et al. | 71—118 |
| 3,084,036 | 4/1963 | Josephs | 71—121 |
| 3,240,799 | 3/1966 | Hageman et al. | 71—76 |
| 3,257,414 | 6/1966 | Hageman et al. | 71—76 |
| 3,305,347 | 2/1967 | Minieri | 71—121 |
| 3,278,597 | 10/1966 | Neighbors | 71—118 |
| 3,318,677 | 5/1967 | Hageman et al. | 71—76 |
| 3,334,991 | 8/1967 | Hageman et al. | 71—113 |

OTHER REFERENCES

Zemlyanukhin, "Effect of Organic Acids on Physiological Processes and Yield" (1964) CA61 p. 4888 (1964).

Greulach, "Screening Tests of Hydrazides, etc." (1961) CA55 p. 22692 (1961).

Thompson et al., "New Growth-Regulating Compounds" (1946) CA41 pp. 3902, 03, 09 (1947).

Fieser et al., "Organic Chemistry," 3rd edition, June 1961, pp. 281–82.

LEWIS GOTTS, Primary Examiner

G. HOLLRAH, Assistant Examiner

U.S. Cl. X.R.

71—88, 94, 95, 106, 113; 260—247.2, 294, 294.3, 326.3, 482, 501.1, 534